(12) United States Patent
Glugla et al.

(10) Patent No.: US 7,966,992 B2
(45) Date of Patent: Jun. 28, 2011

(54) COMBUSTION CONTROL USING ION SENSE FEEDBACK AND MULTI-STRIKE SPARK TO MANAGE HIGH DILUTION AND LEAN AFR

(75) Inventors: Chris Paul Glugla, Macomb, MI (US); Michael Damian Czekala, Canton, MI (US); Garlan J Huberts, Milford, MI (US); Daniel Lawrence Meyer, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 351 days.

(21) Appl. No.: 12/371,612

(22) Filed: Feb. 15, 2009

(65) Prior Publication Data
US 2010/0206267 A1 Aug. 19, 2010

(51) Int. Cl.
*F02M 1/00* (2006.01)

(52) U.S. Cl. ........ 123/434; 123/435; 123/345; 123/609; 123/630

(58) Field of Classification Search .................. 123/434, 123/435, 321, 322, 345–348, 406.11, 406.47, 123/594, 609, 630, 644; 701/103, 104, 105; 324/378, 395, 391
See application file for complete search history.

(56) References Cited

U.S. PATENT DOCUMENTS

| | | | |
|---|---|---|---|
| 5,215,067 A | 6/1993 | Shimasaki et al. | |
| 5,247,919 A | 9/1993 | Akaki et al. | |
| 5,425,339 A | 6/1995 | Fukui | |
| 5,945,828 A | 8/1999 | Katogi et al. | |
| 5,970,952 A | 10/1999 | Mogi et al. | |
| 6,076,502 A | 6/2000 | Katashiba et al. | |
| 6,155,241 A | 12/2000 | Hohner et al. | |
| 6,691,555 B2 | 2/2004 | Ohkama et al. | |
| 6,752,004 B2 | 6/2004 | Inada et al. | |
| 6,813,933 B1 | 11/2004 | Ketterer et al. | |
| 6,865,929 B2 | 3/2005 | Okamura et al. | |
| 6,922,057 B2 * | 7/2005 | Zhu et al. | 324/382 |
| 6,922,628 B2 | 7/2005 | Zhu et al. | |
| 7,013,871 B2 | 3/2006 | Zhu et al. | |
| 7,302,932 B2 | 12/2007 | Shelby et al. | |
| 2004/0084034 A1 * | 5/2004 | Huberts et al. | 123/630 |
| 2004/0084036 A1 * | 5/2004 | Porter et al. | 123/634 |
| 2007/0079817 A1 | 4/2007 | VanDyne et al. | |
| 2007/0144481 A1 * | 6/2007 | Ciecinski et al. | 123/299 |
| 2009/0101114 A1 * | 4/2009 | Czekala et al. | 123/480 |
| 2010/0057327 A1 * | 3/2010 | Glugla et al. | 701/103 |
| 2010/0318279 A1 * | 12/2010 | Meyer et al. | 701/103 |
| 2011/0041803 A1 * | 2/2011 | Qu et al. | 123/406.2 |

* cited by examiner

*Primary Examiner* — John T Kwon
(74) *Attorney, Agent, or Firm* — Julia Voutyras; Brooks Kushman P.C.

(57) ABSTRACT

A system and method for operating a multiple cylinder internal combustion engine having at least one actuator for controlling charge dilution of at least one cylinder and at least one spark plug per cylinder include attempting to improve combustion quality by modifying ignition energy of the at least one spark plug before modifying charge dilution of the cylinder, and modifying both ignition energy and charge dilution substantially simultaneously to establish combustion if an ionization sense signal associated with the cylinder indicates a misfire.

20 Claims, 3 Drawing Sheets

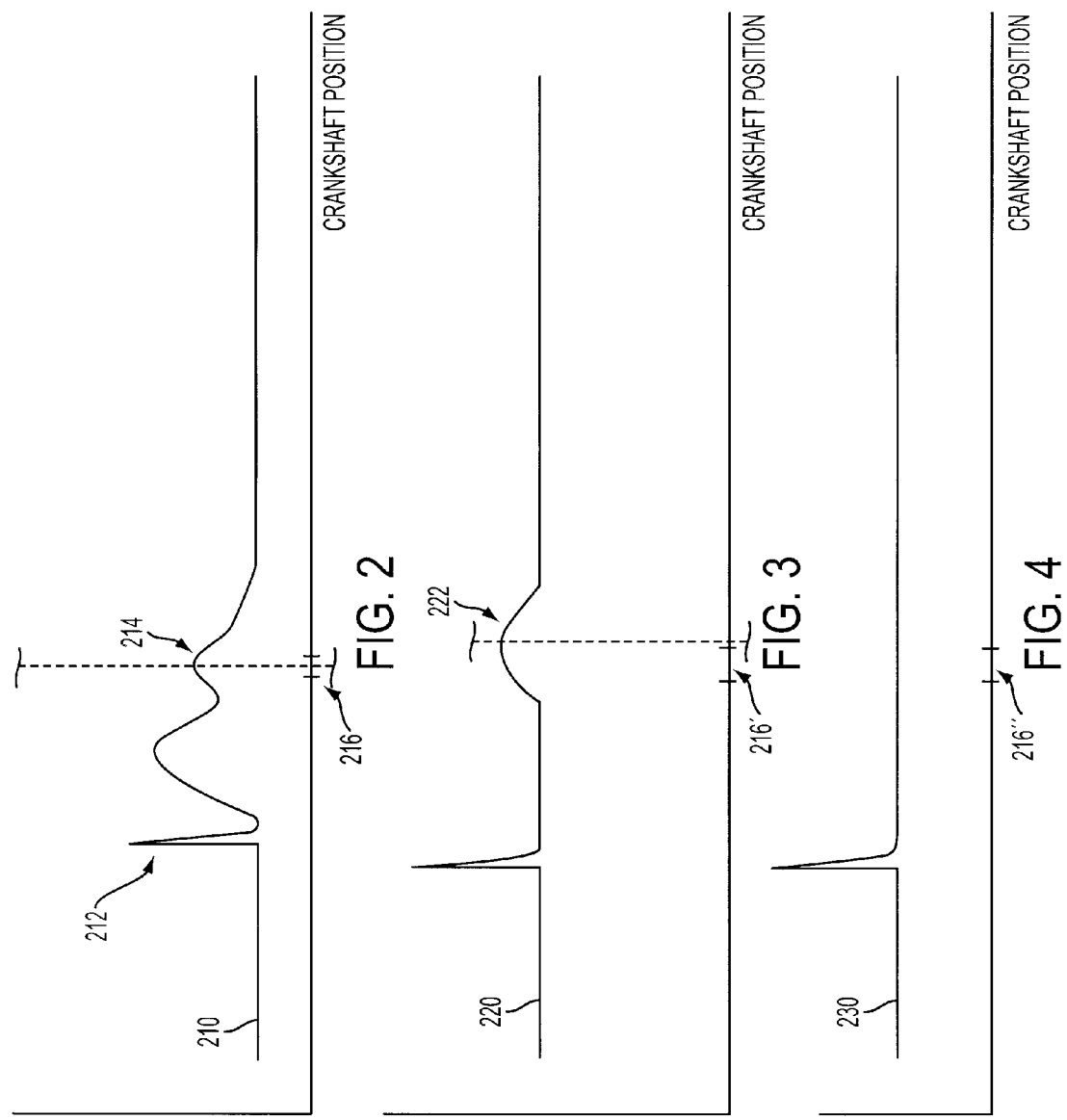

Figure 1:
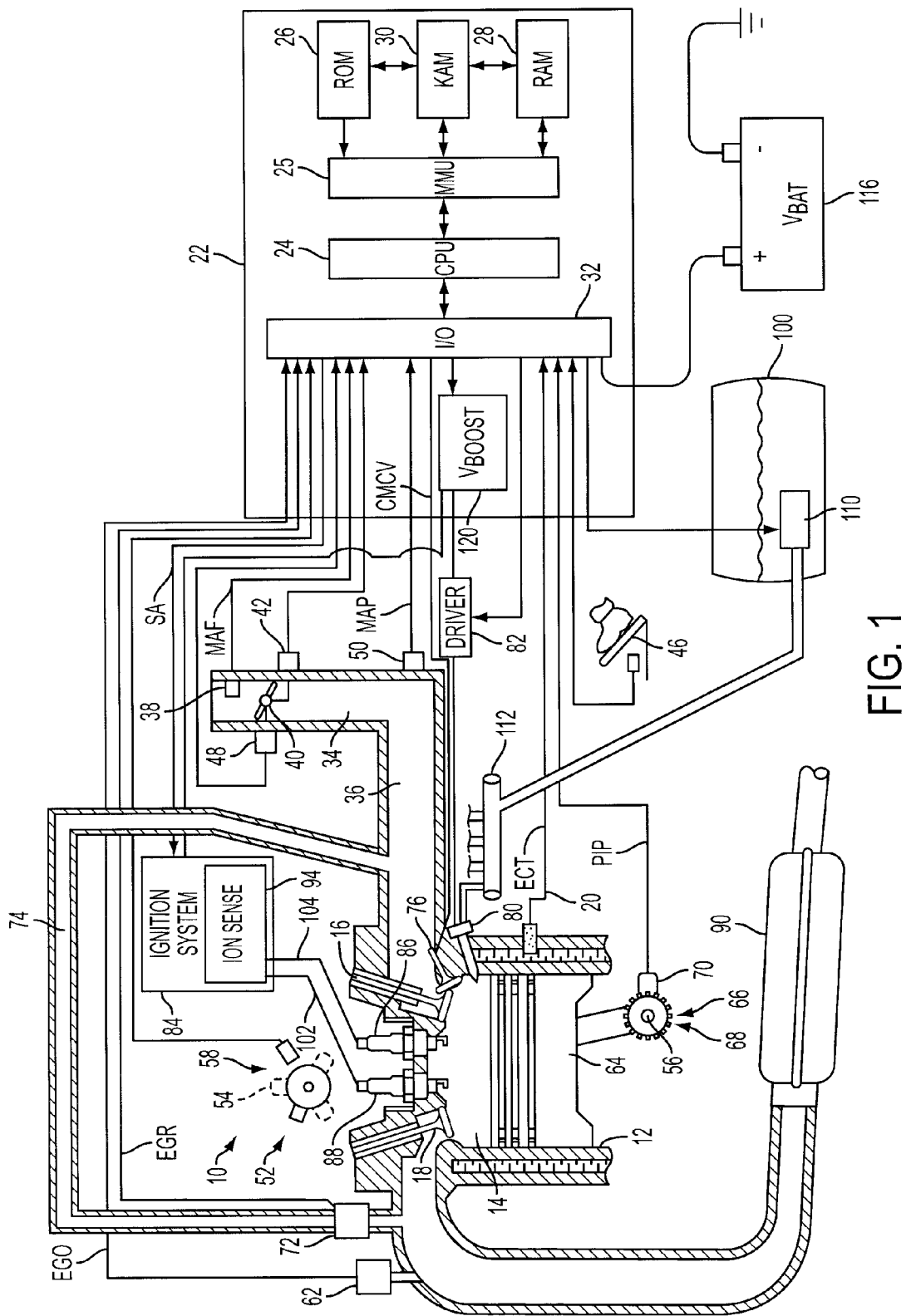

COMBUSTION CONTROL USING ION SENSE FEEDBACK AND MULTI-STRIKE SPARK TO MANAGE HIGH DILUTION AND LEAN AFR

BACKGROUND

1. Technical Field. The present disclosure relates to systems and methods for controlling an internal combustion engine having at least one spark plug per cylinder with ionization signal sensing feedback to manage high dilution and lean air/fuel ratios.

2. Background Art. Manufacturers continue to improve control of internal combustion engines to enhance fuel economy and performance while reducing emissions using more sophisticated sensing and processing hardware and software. To improve control of the combustion process, ionization signal sensing (or ion sense) uses a bias voltage applied across a sensor positioned within the combustion chamber to generate a signal indicative of the combustion quality and timing. For spark-ignition engines, one or more spark plugs may be used as an ion sensor with the bias voltage applied across the air gap of the spark plug, or between a spark plug electrode and the cylinder wall.

Various strategies are being investigated to increase power density and downsize engines, i.e. provide smaller, lighter engines with power equal to or greater than more conventional larger and heavier engines. For example, lean air/fuel ratio operation, and cooled external exhaust gas recirculation (EGR) on turbocharged or supercharged engines may be used to increase power density. Typically, these smaller engines operate at higher loads where pumping losses are reduced to further improve fuel economy. However, combustible mixtures supplied to the engine cylinders with high levels of dilution and lean air/fuel ratios are more difficult to ignite and to achieve complete combustion. Previous strategies included increasing ignition energy by using larger spark plug gaps, raising the ignition coil output, and/or sparking multiple times. While these approaches may be suitable for some applications, increased ignition energy may lead to premature spark plug wear and gap erosion resulting in associated combustion performance degradation, which may adversely impact fuel efficiency, drivability, and/or feedgas emissions.

SUMMARY

A system and method for operating a multiple cylinder internal combustion engine having at least one spark plug per cylinder include attempting to improve combustion quality by modifying ignition energy of the at least one spark plug before modifying charge dilution of the cylinder, and modifying both ignition energy and charge dilution substantially simultaneously to establish combustion if an ionization sense signal associated with the cylinder indicates a misfire.

In one embodiment, a multiple cylinder internal combustion engine includes at least one spark plug per cylinder in communication with a controller. The controller determines initial ignition energy and charge dilution based on current operating and/or ambient conditions/modes and analyzes an ionization sensing feedback signal to determine whether a selected cylinder has misfired or has a desired combustion quality. If the ionization sensing signal indicates a misfire, ignition energy and charge dilution are adjusted substantially simultaneously until combustion is achieved. If combustion is indicated by the ionization sensing signal, the controller first modifies the ignition energy of the cylinder to improve combustion, and if a desired combustion quality is not obtained, then attempts to improve combustion quality by modifying charge dilution. Ignition energy can be modified by increasing ignition coil energy or repetitively firing at least one spark plug during a single combustion cycle. Charge dilution can be modified by changing the amount of internal or external exhaust gas recirculation, increasing fuel, or decreasing air, for example.

The present disclosure includes embodiments having various advantages. For example, the systems and methods of the present disclosure use ionization sensing feedback to more accurately control combustion within individual cylinders to manage fuel economy, performance, and emissions by controlling combustion quality by appropriately managing ignition energy and charge dilution. Effective combustion management facilitates downsizing of engines with smaller engines providing power similar to larger engines with more conventional control strategies.

The above advantage and other advantages and features will be readily apparent from the following detailed description of the preferred embodiments when taken in connection with the accompanying drawings.

DETAILED DESCRIPTION OF THE DRAWINGS

Figure 5:
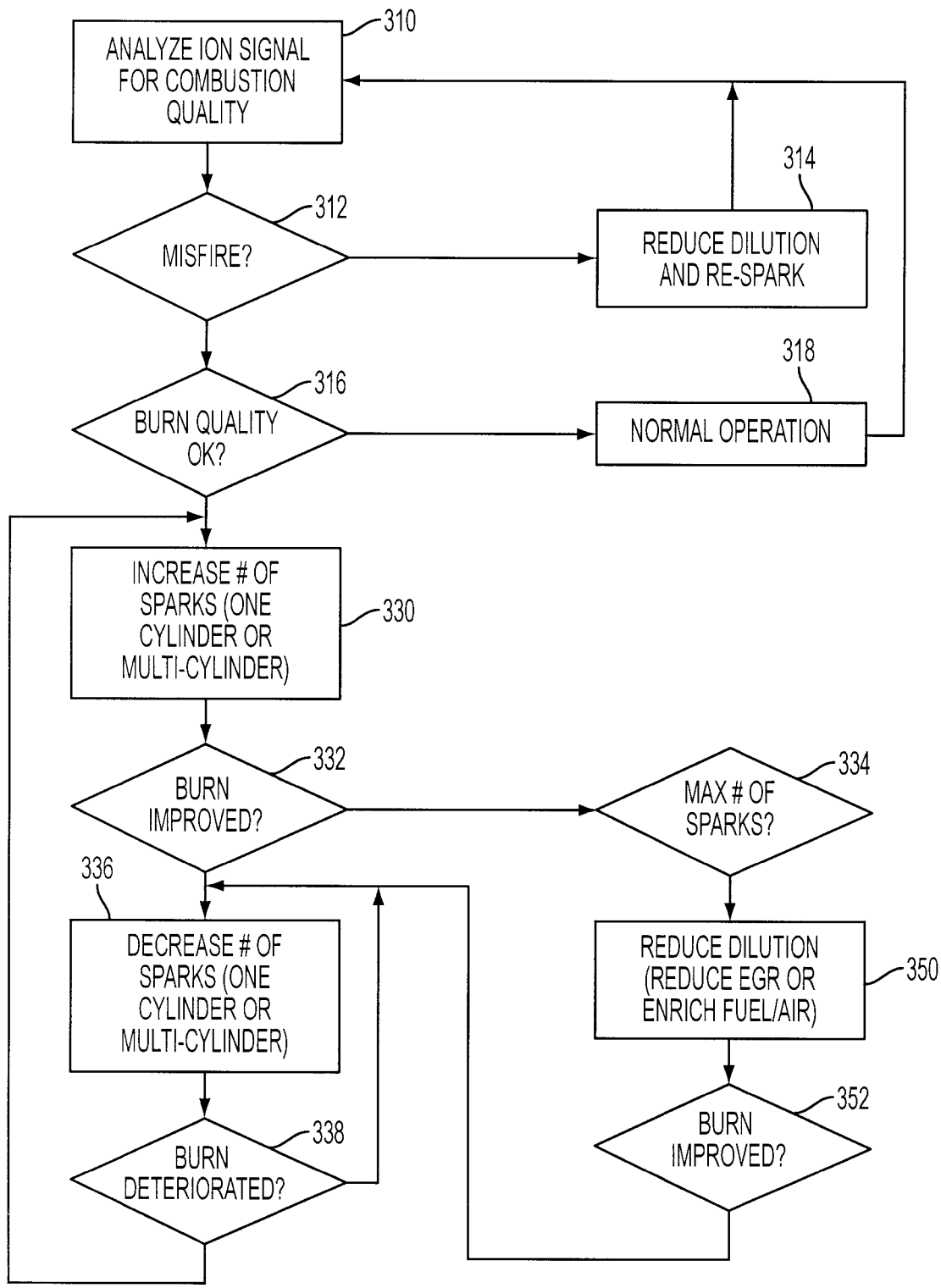

FIG. 1 is a block diagram illustrating operation of a system or method for controlling combustion quality using ignition energy and charge dilution based on ionization sensing feedback according to one embodiment of the present disclosure;

FIGS. 2-4 are representative ionization sensing signals used to determine combustion quality and detect misfire for subsequent adjustments to ignition energy and/or dilution according to embodiments of the present disclosure; and FIG. 5 is a flow chart illustrating operation of a system or method for controlling ignition energy and charge dilution to achieve desired combustion quality according to embodiments of the present disclosure.

DETAILED DESCRIPTION OF EMBODIMENT(S)

As those of ordinary skill in the art will understand, various features of the embodiments illustrated and described with reference to any one of the Figures may be combined with features illustrated in one or more other Figures to produce embodiments that are not explicitly illustrated or described. The combinations of features illustrated provide representative embodiments for typical applications. However, various combinations and modifications of the features consistent with the teachings of the present disclosure may be desired for particular applications or implementations. The representative embodiments used in the illustrations relate generally to a multi-cylinder, internal combustion engine having at least one spark plug per cylinder that also function as an ionization sensor. However, the teachings of the present disclosure may also be used in applications having a separate ionization sensor. Those of ordinary skill in the art may recognize similar applications or implementations with other engine/vehicle technologies.

System 10 includes an internal combustion engine having a plurality of cylinders, represented by cylinder 12, with corresponding combustion chambers 14. As one of ordinary skill in the art will appreciate, system 10 includes various sensors and actuators to effect control of the engine. A single sensor or actuator may be provided for the engine, or one or more sensors or actuators may be provided for each cylinder 12, with a representative actuator or sensor illustrated and described. For example, each cylinder 12 may include four actuators that operate intake valves 16 and exhaust valves 18 for each cylinder in a multiple cylinder engine. However, the engine may include only a single engine coolant temperature sensor 20.

Controller 22, sometimes referred to as an engine control module (ECM), powertrain control module (PCM) or vehicle control module (VCM), has a microprocessor 24, which is part of a central processing unit (CPU), in communication with memory management unit (MMU) 25. MMU 25 controls the movement of data among various computer readable storage media and communicates data to and from CPU 24. The computer readable storage media preferably include volatile and nonvolatile storage in read-only memory (ROM) 26, random-access memory (RAM) 28, and keep-alive memory (KAM) 30, for example. KAM 30 may be used to store various operating variables while CPU 24 is powered down. The computer-readable storage media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by CPU 24 in controlling the engine or vehicle into which the engine is mounted. The computer-readable storage media may also include floppy disks, CD-ROMs, hard disks, and the like. Some controller architectures do not contain an MMU 25. If no MMU 25 is employed, CPU 24 manages data and connects directly to ROM 26, RAM 28, and KAM 30. Of course, more than one CPU 24 may be used to provide engine control and controller 22 may contain multiple ROM 26, RAM 28, and KAM 30 coupled to MMU 25 or CPU 24 depending upon the particular application.

In one embodiment, the computer readable storage media include stored data or code representing instructions executable by controller 22 to control a multiple cylinder internal combustion engine having at least one spark plug per cylinder. The code includes instructions that attempt to improve combustion quality as determined by an ionization sensing signal associated with a selected cylinder by modifying ignition energy of the at least one spark plug before modifying charge dilution of the cylinder if ignition energy changes do not result in a desired combustion quality as described in greater detail herein. The code may also include instructions that adjust both ignition energy and charge dilution substantially simultaneously to establish combustion if an ionization sensing signal associated with the cylinder indicates a misfire.

System 10 includes an electrical system powered at least in part by a battery 116 providing a nominal voltage, $V_{BAT}$, which is typically either 12V or 24V, to power controller 22. As will be appreciated by those of ordinary skill in the art, the nominal voltage is an average design voltage with the actual steady-state and transient voltage provided by the battery varying in response to various ambient and operating conditions that may include the age, temperature, state of charge, and load on the battery, for example. Power for various engine/vehicle accessories may be supplemented by an alternator/generator during engine operation as well known in the art. A high-voltage power supply 120 may be provided in applications using direct injection and/or to provide the bias voltage for ion current sensing. Alternatively, ion sensing circuitry may be used to generate the bias voltage using the ignition coil and/or a capacitive discharge circuit as known.

In applications having a separate high-voltage power supply, power supply 120 generates a boosted nominal voltage, $V_{BOOST}$, relative to the nominal battery voltage and may be in the range of 85V-100V, for example, depending upon the particular application and implementation. Power supply 120 may be used to power fuel injectors 80 and one or more ionization sensors, which may be implemented by spark plugs 86, 88. As illustrated in the embodiment of FIG. 1, the high-voltage power supply 120 may be integrated with control module 22. Alternatively, an external high-voltage power supply may be provided if desired. Although illustrated as a single functional block in FIG. 1, some applications may have multiple internal or external high-voltage power supplies 120 that each service components associated with one or more cylinders or cylinder banks, for example.

CPU 24 communicates with various sensors and actuators affecting combustion within cylinder 14 via an input/output (I/O) interface 32. Interface 32 may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to CPU 24. Examples of items that may be actuated under control of CPU 24, through I/O interface 32, are fuel injection timing, fuel injection rate, fuel injection duration, throttle valve position, spark plug ignition timing, ionization current sensing and conditioning, charge motion control, valve timing, exhaust gas recirculation, and others. Sensors communicating input through I/O interface 32 may indicate piston position, engine rotational speed, vehicle speed, coolant temperature, intake manifold pressure, accelerator pedal position, throttle valve position, air temperature, exhaust temperature, exhaust air to fuel ratio, exhaust constituent concentration, and air flow, for example.

In operation, air passes through intake 34 and is distributed to the plurality of cylinders via an intake manifold, indicated generally by reference numeral 36. System 10 preferably includes a mass airflow sensor 38 that provides a corresponding signal (MAF) to controller 22 indicative of the mass airflow. A throttle valve 40 may be used to modulate the airflow through intake 34. Throttle valve 40 is preferably electronically controlled by an appropriate actuator 42 based on a corresponding throttle position signal generated by controller 22. The throttle position signal may be generated in response to a corresponding engine output or demanded torque indicated by an operator via accelerator pedal 46. A throttle position sensor 48 provides a feedback signal (TP) to controller 22 indicative of the actual position of throttle valve 40 to implement closed loop control of throttle valve 40. Throttle valve 40 may also be controlled to adjust charge dilution by increasing or decreasing the amount of airflow supplied to the cylinders. Assuming fueling, EGR flow (if any), and valve timing parameters remain unchanged, additional airflow would result in increased dilution or lower/leaner fuel/air ratios, whereas reducing airflow would result in decreased dilution or richer fuel/air ratios. Charge dilution may also be affected by various ambient conditions including intake air temperature and relative humidity as described in greater detail herein.

A manifold absolute pressure sensor 50 is used to provide a signal (MAP) indicative of the manifold pressure to controller 22. Air passing through intake manifold 36 enters combustion chamber 14 through appropriate control of one or more intake valves 16. Intake valves 16 and/or exhaust valves 18 may be controlled using electromagnetic valve actuators to provide variable valve timing (VVT), using a variable cam timing (VCT) device to control intake and/or exhaust valve timing, or using a conventional camshaft arrangement, indicated generally by reference numeral 52. Depending upon the particular technology employed, charge dilution may be adjusted by controlling the intake and/or exhaust valve timing to control internal and/or external EGR or to control intake airflow, for example. In the embodiment illustrated in FIG. 1, camshaft arrangement 52 includes a camshaft 54 that completes one revolution per combustion or engine cycle, which requires two revolutions of crankshaft 56 for a four-stroke engine, such that camshaft 54 rotates at half the speed of crankshaft 56. Rotation of camshaft 54 (or controller 22 in a variable cam timing or camless VVT engine application) controls one or more exhaust valves 18 to exhaust the combusted air/fuel mixture through an exhaust manifold. A portion of the exhaust gas may be redirected by exhaust gas recirculation (EGR) valve 72 through an EGR circuit 74 to intake 36. Depending upon the particular application and implementation, external recirculated exhaust gas may flow through an EGR cooler (not shown) and implemented as high-pressure and/or low-pressure EGR in boosted applications. EGR valve 72 may be controlled by controller 22 to control the amount of EGR based on current operating and ambient conditions to adjust charge dilution and obtain a desired combustion quality as described in greater detail herein.

As generally understood by those of ordinary skill in the art, internal EGR (or residual mass fraction) refers to the residual gases that remain in the combustion chamber from a previous combustion event and contributes to the dilution of the air/fuel charge. The amount of internal EGR may be controlled by adjusting the open/close timing of intake and/or exhaust valves in engines having that capability. In contrast, external EGR refers to exhaust gases that exit the combustion chambers and are routed back to the intake for use in subsequent combustion events. The amount of external EGR may be controlled by a corresponding EGR valve 72 to adjust charge dilution. Because external EGR is generally supplied to the intake manifold, it affects charge dilution of all cylinders. However, various engines may have the ability to control intake/exhaust valve timing to control external EGR on an individual cylinder basis.

A sensor 58 provides a signal from which the rotational position of the camshaft can be determined. Cylinder identification sensor 58 may include a single-tooth or multi-tooth sensor wheel that rotates with camshaft 54 and whose rotation is detected by a Hall effect or variable reluctance sensor. Cylinder identification sensor 58 may be used to identify with certainty the position of a designated piston 64 within cylinder 12 for use in determining fueling, ignition timing, or ion sensing, for example.

Additional rotational position information for controlling the engine is provided by a crankshaft position sensor 66 that includes a toothed wheel 68 and an associated sensor 70.

An exhaust gas oxygen sensor 62 provides a signal (EGO) to controller 22 indicative of whether the exhaust gasses are lean or rich of stoichiometry. Depending upon the particular application, sensor 62 may by implemented by a HEGO sensor or similar device that provides a two-state signal corresponding to a rich or lean condition. Alternatively, sensor 62 may be implemented by a UEGO sensor or other device that provides a signal proportional to the stoichiometry of the exhaust feedgas. This signal may be used to adjust the air/fuel ratio, or control the operating mode of one or more cylinders, for example. The exhaust feedgas is passed through the exhaust manifold and one or more emission control or treatment devices 90 before being exhausted to atmosphere.

A fuel delivery system includes a fuel tank 100 with a fuel pump 110 for supplying fuel to a common fuel rail 112 that supplies injectors 80 with pressurized fuel. In some direct-injection applications, a camshaft-driven high-pressure fuel pump (not shown) may be used in combination with a low-pressure fuel pump 110 to provide a desired fuel pressure within fuel rail 112. Fuel pressure may be controlled within a predetermined operating range by a corresponding signal from controller 22. In the representative embodiment illustrated in FIG. 1, fuel injector 80 is side-mounted on the intake side of combustion chamber 14, typically between intake valves 16, and injects fuel directly into combustion chamber 14 in response to a command signal from controller 22 processed by driver 82. Of course, the present disclosure may also be applied to applications having fuel injector 80 centrally mounted through the top or roof of cylinder 14, or with a port-injected configuration, for example.

Driver 82 may include various circuitry and/or electronics to selectively supply power from high-voltage power supply 120 to actuate a solenoid associated with fuel injector 80 and may be associated with an individual fuel injector 80 or multiple fuel injectors, depending on the particular application and implementation. Although illustrated and described with respect to a direct-injection application where fuel injectors often require high-voltage actuation, those of ordinary skill in the art will recognize that the teachings of the present disclosure may also be applied to applications that use port injection or combination strategies with multiple injectors per cylinder and/or multiple fuel injections per cycle.

In the embodiment of FIG. 1, fuel injector 80 injects a quantity of fuel directly into combustion chamber 14 in one or more injection events for a single engine cycle based on the current operating mode in response to a signal (fpw) generated by controller 22 and processed and powered by driver 82. As previously described, fuel injector 80 may be used as an actuator for controlling charge dilution by controlling fuel injector 80 to modify the quantity of fuel provided to the combustion chamber to achieve a desired fuel/air ratio for a selected cylinder. At the appropriate time during the combustion cycle, controller 22 generates signals (SA) processed by ignition system 84 to individually control at least one spark plug 86, 88 associated with a single cylinder 12 during the power stroke of the cylinder to initiate combustion within chamber 14. Controller 22 subsequently applies a high-voltage bias across at least one spark plug 86, 88 to enable ionization signal sensing to provide combustion quality feedback. Depending upon the particular application, the high-voltage bias may be applied across the spark (air) gap or between the center electrode of spark plug 86, 88 and the wall of cylinder 12.

Controller 22 attempts to improve combustion quality as determined by the ionization sensing signal associated with the selected cylinder by modifying ignition energy of at least one spark plug 86, 88 before modifying charge dilution for the selected cylinder. Ignition energy may be increased by increasing the number of sparks per combustion cycle, for example. For applications having two or more spark plugs 86, 88, ignition energy may be increased by repetitively sparking one or both spark plugs. Alternatively, or in combination, ignition energy may be increased by increasing the ignition coil dwell time or coil voltage. Ignition system 84 may include one or more ignition coils with each ignition coil having a primary winding and one or more secondary windings to efficiently control multiple spark plugs and provide the same polarity signal to each spark plug of a particular cylinder 12 in multiple plug applications. Charging of the ignition coil may be powered by high-voltage power supply 120 or by battery voltage depending upon the particular application and implementation.

As shown in FIG. 1, ignition system 84 may include an ion sense circuit 94 associated with one or both of the spark plugs 86, 88 in one or more cylinders 12. Ion sense circuit 94 operates to selectively apply a bias voltage to at least one of spark plugs 86, 88 after spark discharge to generate a corresponding ion sense signal as shown by the representative ionization sensing signals of FIGS. 2-4 for analysis by controller 22 to determine combustion quality. The ion sense signal may be used by controller 22 for various diagnostic and combustion control purposes. In one embodiment, the ion sense signal is used as a feedback signal to provide an indication of combustion quality and subsequently to adjust ignition energy, charge dilution, or both in an attempt to improve combustion quality as determined by the ion sensing signal.

Controller 22 includes code implemented by software and/or hardware to control system 10. Controller 22 generates signals to initiate coil charging and subsequent spark discharge for at least one spark plug 86, 88 and monitors the ionization sensing signal during the period after anticipated or expected spark discharge of the at least one spark plug 86, 88 as shown and described with reference to FIGS. 2-4. The ionization sensing signal may be used to provide information relative to combustion quality to manage fuel economy, emissions, and performance in addition to detecting various conditions that may include engine knock, misfire, pre-ignition, etc. Controller 22 then controls charge dilution and ignition energy to achieve desired combustion quality by first adjusting ignition energy and adjusting charge dilution only if ignition energy adjustments do not result in the desired combustion quality. However, if the ionization sensing feedback signal indicates a misfire, controller 22 controls ignition energy and charge dilution substantially simultaneously to reduce charge dilution (or enrich fuel/air ratio) and increase ignition energy to establish combustion. Actuators affecting ignition energy may include the ignition module or coil, power supplies, and spark plug(s), for example. Actuators affecting charge dilution may include fuel injectors, throttle valve, EGR valve, and valve timing devices, for example. Those of ordinary skill in the art will recognize that some actuators may be used to control ignition energy or charge dilution for a selected cylinder, while other actuators may affect ignition energy or charge dilution for a bank of cylinders or for the entire engine.

FIGS. 2-4 are representative ionization sensing signals analyzed by controller 22 (FIG. 1) to determine combustion quality. Real-time acquired ion sense signals for each engine cylinder for each spark plug or other ionization sensor are gathered and stored by controller 22 (FIG. 1). For each combustion event, at each spark plug, the information for the most recent engine cylinder firing may be processed to identify features indicative of combustion quality such as peak values, signal integral areas, derivative or slope values, statistics (such as maximum, minimum, mean, or variability) based on these values, or crankshaft locations of any of the values or statistics to determine combustion quality and/or detect various conditions such as misfire, for example. The particular feature or characteristic(s) of the ionization sensing signal used to determine combustion quality may vary by application and implementation. The ion signals for each ignition coil in a shared cylinder are sampled at a given time or crankshaft degree intervals relative to expected ignition timing. These curve features, time-based, and/or angle-based measurements can be averaged to remove statistical random components of the ion combustion signal. As used herein, ionization sensing signals may include the signal corresponding to an individual combustion event, or to a statistically averaged signal for a particular sensor, cylinder, cycle, etc. Generally, sufficient numbers of samples, or cylinder event series of samples, are used to ensure statistical significance for all measurements. These measurements may be collected in one group or in a one-in, one-out, sliding window form. The data elements representing one or more series of measurements may be processed to produce a regression equation once the sample size is appropriate for the desired statistical significance. These regression equations and/or transfer functions can then be used to estimate either historical or instantaneous engine combustion quality/stability. The regression equation and or transfer function may be periodically updated for the desired level of accuracy. One skilled in the art will also recognize that other systems such as neural networks could be utilized to ascertain combustion information from the ionization sensing signals. When the engine operating time has been sufficient to allow for valid combustion stability measurements by means other that ionization sensing, these values can be used to calibrate the accuracy of the combustion stability estimate based on ionization sensing.

The regression equations, transfer functions, combustion stability estimates, and corrections based upon these estimates can all be adaptively stored for subsequent use, with resets at appropriate vehicle events, such as refueling, altitude changes, etc. FIG. 2 illustrates a representative ionization sensing signal 2 associated with at least one spark plug or other ionization sensor during a representative combustion cycle. Ionization sensing signal 210 represents an acceptable combustion quality with a spark initiated at 212 and the ionization signal analyzed during a predetermined period after the spark. In the example of FIG. 2, combustion quality is determined by the level and position of a second peak 214 of ionization signal 210. The peak level is within a desired range and the peak occurs within a corresponding range 216 of acceptable crankshaft angular positions relative to spark 212 such that the combustion quality is considered acceptable and ignition energy and charge dilution would not be modified to change the combustion quality in this example.

In the representative example illustrated in FIG. 3, ionization sensing signal 220 is monitored and peak 222 is analyzed to determine combustion quality. In this example, the peak value is lower than desired and occurs outside of the desired range 216'. As such, controller 22 would attempt to improve the ignition quality by first modifying ignition energy and then modifying charge dilution if ignition energy alone is insufficient to obtain acceptable combustion quality as represented by the ionization signal characteristics as illustrated in FIG. 2. As previously described, ignition energy may be modified by changing the number of sparks per combustion cycle, by increasing coil energy, modifying spark timing, or controlling number of sparks and relative timing between two or more spark plugs associated with a common cylinder. In general, controller 22 attempts to maximize dilution for best fuel economy and minimize the ignition energy to conserve spark plug life while obtaining acceptable combustion quality to manage emissions and performance.

In the example of FIG. 4, ionization sensing signal 230 is monitored by controller 22, but no peak is detected, which indicates a misfire. Controller 22 then adjusts ignition energy and charge dilution substantially simultaneously by increasing ignition energy and decreasing charge dilution to re-establish combustion as quickly as possible.

FIG. 5 is a flow chart illustrating operation of a system or method for controlling an internal combustion engine having at least one spark plug per cylinder according to the present disclosure. As those of ordinary skill in the art will understand, the functions represented by the flow chart blocks may be performed by software and/or hardware. Depending upon the particular processing strategy, such as event-driven, interrupt-driven, etc., the various functions may be performed in an order or sequence other than illustrated in the Figures.

Similarly, one or more steps or functions may be repeatedly performed, although not explicitly illustrated. In one embodiment, the functions illustrated are primarily implemented by software, instructions, or code stored in a computer readable storage medium and executed by a microprocessor-based computer or controller to control operation of the engine.

The ionization sensing signal is monitored to determine combustion quality as represented by block 310 of FIG. 5. If the ionization sensing signal indicates a misfire as represented by block 312, charge dilution is reduced and ignition energy is increased substantially simultaneously as represented by block 314 and the process repeats with block 310 until combustion is established. If misfire is not detected, block 316 determines whether the combustion quality is acceptable. As previously described, the combustion quality may be determined by examining a single ionization sensing feedback signal associated with a selected cylinder, or based on signal samples of multiple cylinders over a number of combustion events. If block 316 determines that combustion quality is acceptable, normal operation using the existing ignition and charge dilution strategy continues as represented by block 318.

If block 316 determines that combustion quality is unacceptable based on one or more signal characteristics from the ionization sensing signal, the controller attempts to improve combustion quality by increasing ignition energy. In the embodiment illustrated in FIG. 5, ignition energy is increased by increasing the number of sparks per combustion cycle as represented by block 330. The increased ignition energy may be applied to a selected cylinder or to all cylinders. The resulting ionization sensing signal during a subsequent combustion cycle or during some sampling period after adjusting the number of sparks is examined to determine if the combustion quality improved as represented by block 332. If the combustion quality is still not acceptable, then block 334 determines whether the maximum number of sparks per combustion cycle has been reached, and if not, increases the number of sparks at 330 in an attempt to improve combustion quality. If combustion quality is not acceptable after increasing ignition energy and reaching a maximum number of sparks for the current engine/vehicle operating/ambient conditions as determined by block 334, then charge dilution is reduced as represented by block 350. Representative strategies for reducing charge dilution include reducing EGR or enriching the fuel/air ratio, for example. Charge dilution will continue to be reduced until an acceptable combustion quality is achieved as represented by blocks 350 and 352.

When reduced charge dilution results in an acceptable combustion quality as represented by block 352, block 336 decreases ignition energy by reducing the number of sparks per combustion cycle until acceptable combustion quality is no longer detected as determined by block 338. Once combustion quality deteriorates, the process is repeated in an attempt to provide acceptable combustion quality while maximizing charge dilution and minimizing the number of sparks.

As previously described and illustrated with reference to FIGS. 1-5, the present disclosure provides a method for controlling an internal combustion engine having at least one spark plug per cylinder that controls charge dilution and ignition energy to achieve desired combustion quality by first adjusting ignition energy and adjusting charge dilution only if ignition energy adjustments do not result in the desired combustion quality. The systems and methods of the present disclosure provide for improved power density to facilitate downsizing of engines by effectively managing ignition energy and charge dilution to maintain desired combustion quality. Using ionization sensing signal feedback to manage charge dilution and ignition energy facilitates operation at higher loads where pumping losses are reduced to further improve fuel economy while providing the necessary ignition energy to reliably initiate combustion of lean or dilute mixtures.

While the best mode has been described in detail, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments discussed herein that are described as less desirable than other embodiments or prior art implementations with respect to one or more characteristics are not outside the scope of the disclosure and may be desirable for particular applications.

What is claimed:

1. A multiple cylinder internal combustion engine having at least one spark plug associated with each cylinder and at least one actuator for controlling charge dilution of at least one cylinder, the engine comprising:
a controller in communication with the at least one actuator and the at least one spark plug, the controller attempting to improve combustion quality as determined by an ionization sensing signal associated with a selected cylinder by modifying ignition energy of the at least one spark plug before modifying charge dilution of the cylinder.

2. The engine of claim 1 wherein the controller adjusts both ignition energy and charge dilution substantially simultaneously to establish combustion if an ionization sensing signal associated with the cylinder indicates a misfire.

3. The engine of claim 2 wherein the controller reduces charge dilution and increases ignition energy to initiate combustion in response to detecting the misfire.

4. The engine of claim 3 wherein the engine includes an exhaust gas recirculation valve and wherein the controller actuates the exhaust gas recirculation valve to reduce charge dilution.

5. The engine of claim 4 wherein the engine increases a number of sparks per combustion cycle to increase ignition energy.

6. The engine of claim 3 wherein the controller actuates at least one of a throttle valve and fuel injector to enrich an air/fuel ratio to reduce charge dilution.

7. The engine of claim 1 wherein the at least one actuator comprises an exhaust gas recirculation valve and wherein the controller actuates the exhaust gas recirculation valve to modify charge dilution of the cylinder.

8. The engine of claim 1 wherein the at least one actuator comprises at least one gas exchange valve and wherein the controller adjusts timing of the at least one valve to modify charge dilution of the cylinder.

9. The engine of claim 1 wherein the controller increases a number of sparks per combustion cycle for the at least one spark plug to modify ignition energy.

10. A computer readable storage medium having code representing instructions executable by a microprocessor based controller to control combustion within a multiple cylinder internal combustion engine having at least one spark plug per cylinder and at least one actuator for controller charge dilution of at least one cylinder, the computer readable storage medium comprising:

code that attempts to improve combustion quality as determined by an ionization sensing signal associated with a selected cylinder by modifying ignition energy of the at least one spark plug before modifying charge dilution of the cylinder; and code that adjusts both ignition energy and charge dilution substantially simultaneously to establish combustion if an ionization sensing signal associated with the cylinder indicates a misfire.

11. The computer readable storage medium of claim 10 further comprising code that reduces charge dilution and increases ignition energy to initiate combustion after detecting the misfire.

12. The computer readable storage medium of claim 10 further comprising code that actuates an exhaust gas recirculation valve to reduce charge dilution by reducing the amount of recirculated exhaust gas.

13. The computer readable storage medium of claim 10 further comprising code that increases a number of sparks per combustion cycle for the at least one spark plug to increase ignition energy of the at least one cylinder.

14. The computer readable storage medium of claim 10 wherein the code comprises code that controls a charge motion control device such that combustion burn rate determined by ionization sensing feedback approaches a desired combustion burn rate selected in response to current engine operating conditions.

15. A method for controlling a multiple cylinder internal combustion engine, the method comprising:

controlling charge dilution and ignition energy to achieve desired combustion quality by first adjusting ignition energy and adjusting charge dilution only if ignition energy adjustments do not result in the desired combustion quality.

16. The method of claim 15 further comprising monitoring an ionization sensing signal associated with a selected cylinder to provide an indication of combustion quality.

17. The method of claim 15 further comprising:

increasing a number of sparks per combustion cycle to adjust ignition energy to achieve the desired combustion quality.

18. The method of claim 15 further comprising:

reducing recirculated exhaust gas to control charge dilution and achieve the desired combustion quality.

19. The method of claim 15 further comprising:

reducing charge dilution and increasing ignition energy substantially simultaneously if an ionization sensing signal associated with a selected cylinder indicates a misfire.

20. The method of claim 15 wherein adjusting ignition energy includes adjusting the number of sparks per combustion cycle and wherein adjusting charge dilution includes adjusting the amount of recirculated exhaust gas supplied to a selected cylinder.

* * * * *